US008654746B2

(12) United States Patent
Cordeiro et al.

(10) Patent No.: US 8,654,746 B2
(45) Date of Patent: Feb. 18, 2014

(54) METHOD, APPARATUS AND SYSTEM FOR FAST SESSION TRANSFER FOR MULTIPLE FREQUENCY BAND WIRELESS COMMUNICATION

(75) Inventors: Carlos Cordeiro, Portland, OR (US); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 309 days.

(21) Appl. No.: 12/977,289

(22) Filed: Dec. 23, 2010

(65) Prior Publication Data

US 2011/0261755 A1   Oct. 27, 2011

Related U.S. Application Data

(60) Provisional application No. 61/327,757, filed on Apr. 26, 2010.

(51) Int. Cl.
*H04W 72/00* (2009.01)
(52) U.S. Cl.
USPC ............ 370/338; 370/343; 370/462; 370/480
(58) Field of Classification Search
None
See application file for complete search history.

(56) References Cited

U.S. PATENT DOCUMENTS

| | | | |
|---|---|---|---|
| 7,801,043 B2 * | 9/2010 | Ali et al. ...................... 370/235 |
| 2003/0236064 A1 | 12/2003 | Shiohara et al. | |
| 2005/0164744 A1 | 7/2005 | du Toit | |
| 2005/0195858 A1 * | 9/2005 | Nishibayashi et al. ....... 370/474 |
| 2005/0281227 A1 | 12/2005 | Vedder et al. | |
| 2006/0034219 A1 | 2/2006 | Gu et al. | |
| 2006/0251119 A1 | 11/2006 | Ramesh | |
| 2007/0104138 A1 | 5/2007 | Rudolf et al. | |
| 2007/0135162 A1 | 6/2007 | Banerjea et al. | |
| 2008/0239957 A1 | 10/2008 | Tokura et al. | |
| 2008/0320354 A1 | 12/2008 | Doppler et al. | |
| 2009/0088089 A1 | 4/2009 | Chandra et al. | |

(Continued)

FOREIGN PATENT DOCUMENTS

| | | |
|---|---|---|
| CN | 1671136 A | 9/2005 |
| CN | 1713775 | 12/2005 |

(Continued)

OTHER PUBLICATIONS

IEEE Std 802.11, IEEE Standard for Information technology—Telecommunications and information exchange between systems—Local and metropolitan area networks—Specific requirements, Part 11: Wireless LAN Medium Access Control (MAC) and Physical Layer (PHY) Specifications—Jun. 2007, pp. 1-1184.

(Continued)

*Primary Examiner* — Alex Skripnikov
(74) *Attorney, Agent, or Firm* — Shichrur & Co.

(57) ABSTRACT

Devices, systems and methods to provide session transfer between a pair of multiband stations by a fast session transfer (FST) setup protocol. The FST protocol or the method may include operating the session on a first frequency band and/or a first channel wherein the session includes or is described by state information kept or stored in a pair of stations that have an established direct physical link; setting an agreement to operate the session on a second frequency band and/or a second channel; establishing a direct physical link on a second frequency band and/or a second channel and transferring the session to the second frequency band and/or the second channel.

15 Claims, 2 Drawing Sheets

(56) References Cited

U.S. PATENT DOCUMENTS

| | | | |
|---|---|---|---|
| 2010/0046455 A1 | 2/2010 | Wentink et al. | |
| 2010/0074190 A1 | 3/2010 | Cordeiro et al. | |
| 2010/0103885 A1 | 4/2010 | Cordeiro et al. | |
| 2010/0332822 A1* | 12/2010 | Liu et al. | 713/151 |
| 2011/0053521 A1 | 3/2011 | Cordeiro | |
| 2011/0065440 A1* | 3/2011 | Kakani | 455/450 |
| 2012/0182954 A1 | 7/2012 | Cordeiro et al. | |

FOREIGN PATENT DOCUMENTS

| | | |
|---|---|---|
| CN | 1813448 | 8/2006 |
| CN | 101116306 A | 1/2008 |
| CN | 101631029 A | 1/2010 |
| EP | 1610509 | 12/2005 |
| JP | 2002335201 A | 11/2002 |
| JP | 2003-244159 | 8/2003 |
| JP | 2003-244159 A | 8/2003 |
| JP | 2006-54884 A | 2/2006 |
| JP | 2007-006327 A | 1/2007 |
| JP | 2007-532047 A | 11/2007 |
| JP | 2008167285 A | 7/2008 |
| JP | 2008538272 A | 10/2008 |
| JP | 2009-518963 A | 5/2009 |
| JP | 2009-206848 A | 9/2009 |
| JP | 2012-503944 A | 2/2012 |
| KR | 10-2007-0043346 A | 4/2007 |
| KR | 10-2007-0120022 A | 12/2007 |
| KR | 10-0819705 B1 | 3/2008 |
| WO | 2005006662 | 1/2005 |
| WO | 2005/069878 A2 | 8/2005 |
| WO | 2006080749 A1 | 8/2006 |
| WO | 20061085194 A1 | 8/2006 |
| WO | 20061107886 A2 | 10/2006 |
| WO | 2010/022256 A2 | 2/2010 |
| WO | 20101022256 A2 | 2/2010 |
| WO | 20101036595 A2 | 4/2010 |
| WO | 2011/005567 A2 | 1/2011 |

OTHER PUBLICATIONS

International Search Report and Written Opinion Received for PCT Application No. PCT/US2010/043846, mailed on Apr. 29, 2011, 8 pages.
Office Action from U.S. Appl. No. 12/551,614 mailed on Apr. 11, 2012; 20 pages.
International Preliminary Report on Patentability for PCT/US2010/043846 mailed on Mar. 15, 2012.
Office Action from U.S. Appl. No. 12/551,614 mailed on Oct. 18, 2012; 19 pages.
International Search Report and Written Opinion for PCT Patent Application No. PCT/US2011/031090, mailed on Nov. 22, 2011, 8 pages.
International Search Report and Written Opinion for PCT Patent Application No. PCT/US2011/033878, mailed on Dec. 15, 2011, 9 pages.
International Search Report and Written Opinion for PCT Patent Application No. PCT/US2011/033886, mailed on Dec. 15, 2011, 9 pages.
U.S. Appl. No. 12/977,244, filed Dec. 23, 2010, Trainin.
U.S. Appl. No. 12/977,268, filed Dec. 23, 2010, Cordeiro.
U.S. Appl. No. 12/551,614, filed Sep. 1, 2009, Cordeiro.
Office Action for Japanese Patent Application No. 2011-090681, Mailed on Sep. 25, 2012, 6 pages of Office Action including 3 pages of English Translation.
Office Action for Japanese Patent Application No. 2011-088260, Mailed on Sep. 25, 2012, 8 pages of Office Action including 4 pages of English Translation.
Office Action for Japanese Patent Application No. 2011-084836, Mailed on Oct. 2, 2012, 4 pages of Office Action including 2 pages of English Translation.
International Preliminary Report on Patentability for PCT/US2011/033878 Mailed on Nov. 8, 2012; 6 pages.
International Preliminary Report on Patentability for PCT/US2011/031090 Mailed on Nov. 8, 2012; 5 pages.
International Preliminary Report on Patentability for PCT/US2011/033886 Mailed on Nov. 8, 2012; 6 pages.
Office Action for U.S. Appl. No. 12/977,244, mailed on Jun. 19, 2013, 33 pages.
Office Action for U.S. Appl. No. 12/977,268, mailed on Jun. 27, 2013, 31 pages.
Office Action for Japanese Patent Application No. 2011-088260, mailed on Feb. 26, 2013, 2 pages of Office Action including 1 page of English Translation.
Office Action for U.S. Appl. No. 13/432,066, mailed on Apr. 15, 2013, 9 pages of Office Action.
Eldad Perahia et al., "IEEE 802.11ad: Defining the Next Generation Multi-Gbps Wi-Fi", IEEE 2010, 5 pages.
Office Action Received for Chinese Patent Application No. 201010287221.3, Mailed on Mar. 5, 2013, 11 pages Office Action including 3 pages English Translation.
Office Action received for Chinese Patent Application No. 201110116563.3, Mailed on May 23, 2013, 17 pages of Office Action Including 10 page of English Translation.
Office Action Received for Japanese Patent Application No. 2012-527879, Mailed on May 14, 2013, 6 pages of Office Action Including 3 page of English Translation.
Cordeiro, "PHY/MAC Complete Proposal to TGad", IEEE 802.11-10/0432r2, May 18, 2010, 57 pages.
Naveen et al., "Fast Session Transfer NT", IEEE 802.11-10/0436r2, May 18, 2010, 15 pages.
Office Action received for Chinese Patent Application No. 201110116551.0, Mailed on Jun. 18, 2013, 16 pages of Office Action Including 9 pages of English Translation.
Office Action for Chinese Patent Application No. 201110116529.6; mailed on Jul. 25, 2013, 23 pages, including 15 pages of English translation.
Office Action recieved for Korean Patent Application No. 10-2012-7025744, Mailed on Nov. 28, 2013, 8 pages of Office Action including 4 pages of Enligh Translation.

* cited by examiner

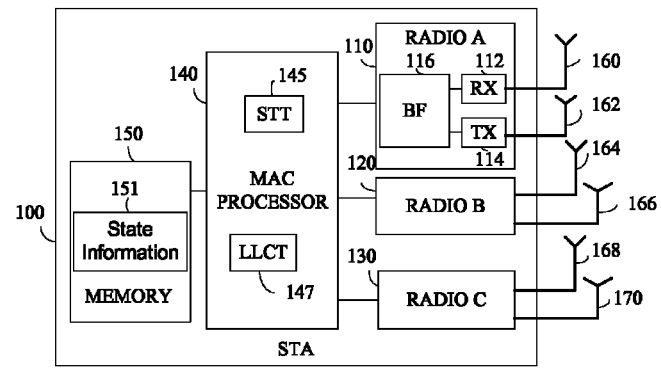
FIG. 1
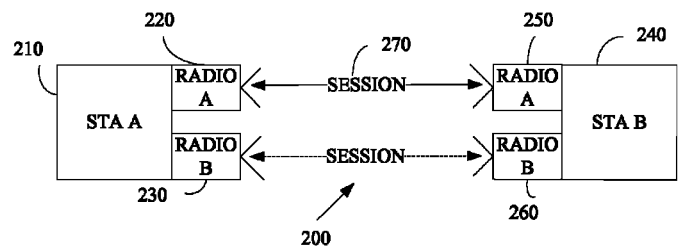
FIG. 2
| 310 | 320 | 330 | 340 | | | 350 | | |
|---|---|---|---|---|---|---|---|---|
| Element ID | Lenght | FSTS ID | New Band | | | Old Band | | |
| | | | Band ID | Setup | Operation | Band ID | Setup | Operations |
| 1 | 1 | 4 | 1 | 1 | 1 | 1 | 1 | 1 |
300
FIG. 3

METHOD, APPARATUS AND SYSTEM FOR FAST SESSION TRANSFER FOR MULTIPLE FREQUENCY BAND WIRELESS COMMUNICATION

CROSS REFERENCE TO RELATED APPLICATIONS

This application claims the priority from U.S. Provisional Patent Application 61/327,757, filed on Apr. 26, 2010 (and entitled "Method System and Apparatus for Communication At Wireless Link"), which is incorporated in its entirety herein by reference.

BACKGROUND OF THE INVENTION

Wireless local area network (WLAN) and personal area network (PAN) devices that use different radios are widely used in many platforms like notebook computers, net-books, desktop computers, cellular telephones, mobile personal devices and the like. The WLAN and PAN devices may include for example, Bluetooth (BT) and WiFi transceivers. The BT and WiFi transceivers may operate on the same frequency band for example, 2.4 GHz band or on different frequency bands. For example, the BT transceiver may operate at the 2.4 GHz band and the WiFi transceiver may operate at the 5 GHz band.

Another frequency band that the WLAN and PAN devices may use is the 60 GHz frequency band. WiFi compliant devices may use 2.5 GHz, 5 GHz and 60 GHz frequency bands. One of the problems with switching transceivers between multiple frequency bands is the switching of traffic streams from one frequency band e.g., 60 GHz to the other frequency band e.g., 5 GHz, 2.4 GHz or operating in parallel in many frequency bands efficiently.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 1 is a schematic illustration of a station of a wireless communication network according to exemplary embodiments of the present invention;

FIG. 2 is a schematic illustration of a wireless communication network according to exemplary embodiments of the present invention;

FIG. 3 is a schematic illustration of an information element used with a fast session transfer protocol, according to exemplary embodiments of the invention.

Figure 4:
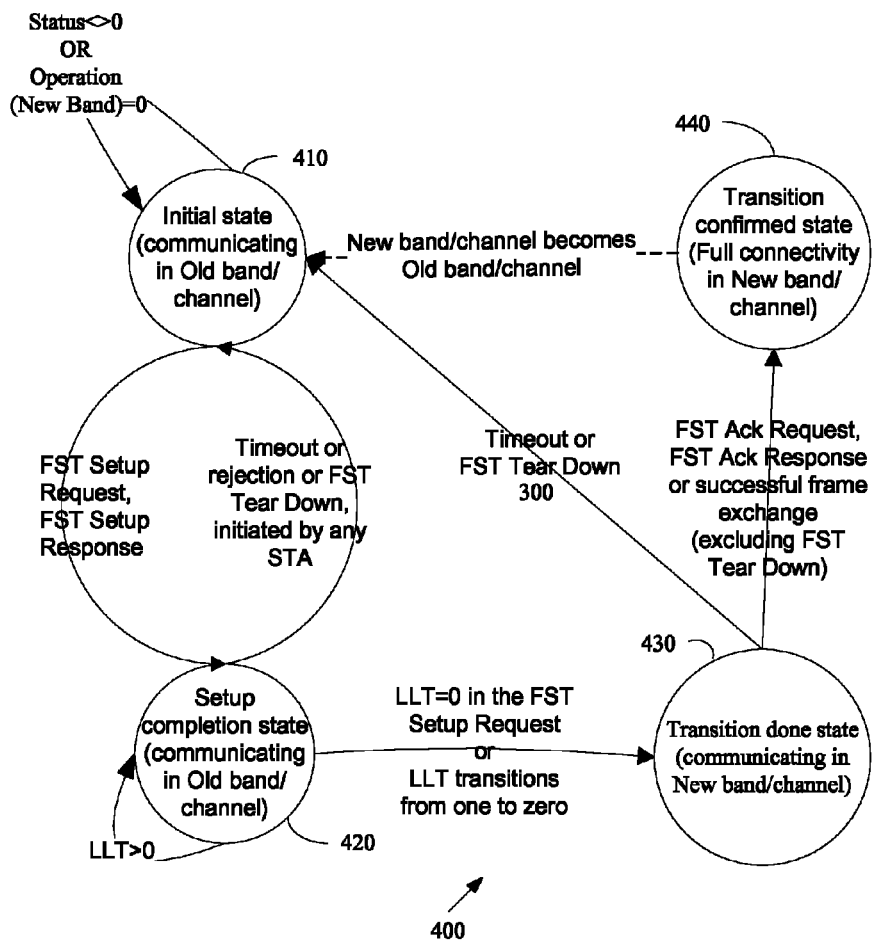
FIG. 4 is a schematic illustration of a state diagram of fast session transfer protocol, according to exemplary embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

The terms "traffic" and/or "traffic stream(s)" as used herein, are defined as a data flow and/or stream between wireless devices such as stations (STAs). The term "session" as used herein is defined as state information kept or stored in a pair of stations that have an established a direct physical (PHY) link (e.g., excludes forwarding); the state information may describe or define the session. The term "fast session transfer" (FST) as used herein is the transfer or movement of a session from a channel to another channel when the communicating STAs both have matching radios in the frequency band(s) they wish to communicate or in which they agree to communicate.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

Embodiments of the invention provide control of the traffic streams before transition from a first frequency band to another frequency band, during the transition and after the transition is completed and the devices are active in the other frequency band or in multiple frequency bands. The provided solution in some embodiments of the present invention may cover a transparent mode when the devices may have for example, the same Media Access Control (MAC) addresses in both frequency bands and other embodiments of the invention may provide a non-transparent mode when at least one of the communicating devices may have different MAC addresses in the different frequency bands, although the scope of the present invention is not limited to these examples.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), and the like.

Types of WPAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-19992007: Wireless LAN Medium Access Control (MAC) and Physical Layer (PHY) Specifications) standards and amendments ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™ Ultra-Wideband (UWB), Global System for Mobile communication (GSM), 2 G, 2.5 G, 3 G, 3.5 G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Turning first to FIG. 1 a schematic illustration of a station (STA) of a wireless communication network according to exemplary embodiments of the present invention is shown. According to embodiments of the present invention a station 100 may be a wireless communication device for example, an access point, a piconet controller (PNC), a station, an initiator, a responder or the like. Station 100 may be, for example, a multiband station.

According to exemplary embodiments of the invention station 100 may include for example, a plurality of radios for example radio A 110, radio B 120 and radio C 130. Each of radio A 110, radio B 120 and radio C 130 is operably coupled to two or more antennas. For example radio A 110 is operably coupled to antennas 160 and 162, radio B 120 is operably coupled to antennas 164 and 166 and radio C is operably coupled to antennas 168 and 170.

Radio A 110, radio B 120 and radio C 130 may have a similar architecture which is shown for radio A 110. For example each radio may include at least a beamforming (BF) controller, a receiver (RX) 112 and a transmitter (TX) 114, although the scope of the present invention is not limited in this respect.

Furthermore, according to some embodiments of the invention, each of the radios may operate on a different frequency band, if desired. For example, radio A 110 may operate on a 60 GHz frequency band, radio B 120 may operate on a 5 GHz frequency band and radio C 130 may operate on 2.4 GHz frequency band, although it should be understood that embodiments of the present invention are not limited to this example.

Station 100 may further include a MAC processor 140 and a memory 150. MAC block 140 may operate a MAC protocol according to IEEE 802.11TAGad and/or IEEE 802.15.3c and or WirelessHD™ and/or ECMA-387 and/or ISO/IEC 13156: 2009 and/or Bluetooth™ and/or WGA specification, if desired.

Furthermore, MAC processor 140 may include a State Transition Timer (STT) 145 and a Link Loss countdown timer (LLCT) 147. STT 145 may control or execute a fast session transfer (FST), if desired. For example, each multiband STA may maintain a STT for each FST session. The multiband stations may move or transition to an initial state 410 (shown in FIG. 4) of the FST when STT 145 moves or transitions from one to zero. LLCT 147 may control transitions from one state to another state of the FST protocol. Memory 150 may include state information 151; state information 151 may be stored in another storage unit.

Memory 150 may include one or more of volatile memory, non-volatile memory, removable or non-removable memory, erasable or non-erasable memory, writeable or re-writeable memory, and the like. For example, memory 150 may include one or more random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like.

In some exemplary embodiments, antennas 160, 162, 164, 166, 168 and 170 may include, for example, phase array antennas, an internal and/or external RF antenna, a dipole antenna, a monopole antenna, an omni-directional antenna, an end fed antenna, a circularly polarized antenna, a microstrip antenna, a diversity antenna, or other type of antenna suitable for transmitting and/or receiving wireless communication signals, blocks, frames, transmission streams, packets, messages and/or data, although the scope of the present invention is not limited to these examples.

In some exemplary embodiments of the invention, BF controller 116 may include a multiple-input-multiple-output (MIMO) controller and/or a beamformer processor, if desired.

According to embodiment of the invention station 100 may be able to move or transfer a session from one frequency band to another frequency band and/or from one channel to another channel using the multiple radios e.g., radio A 110, radio B 120 and/or radio C 130, although it should be understood that embodiments of the present invention are not limited in this respect.

For example, multiband STA 100 may operate the session on a first frequency band (e.g., 60 GHz by radio A 110) and/or a first channel wherein the session is or is described by state information kept or stored in a pair of stations that have an established direct physical link. Multiband STA 100 may set or establish an agreement to operate the session on a second frequency band (e.g., 2.4 GHz by radio B 120) and/or a second channel and may establish a direct physical link on the second frequency band and/or the second channel with other multiband STA, if desired. Multiband STA 110 may transfer or move the session to the second frequency band and/or the second channel by using for example, a fast session transfer (FST) protocol which will be described in details below with reference to FIG. 4.

FIG. 2 is a schematic illustration of a wireless communication network 200 according to exemplary embodiments of the present invention. For example, wireless communication network 200 may operate according to the standard developed by the IEEE 802 802.11 Task Group ad (TGad) and/or according to WGA specification and/or according to IEEE 802.15.3c standard and/or according to WirelessHD™ specification and/or ECMA-387 standard or the like.

Although the scope of the present invention is not so limited, wireless communication network 200 may include a station A 210 and a station B 240. Station A may include a radio A 220 and a radio B 230 and station B may include a radio A 250 and a radio B 260. Station (STA) A 210 may be referred to herein as an Initiator and STA B 240 may be referred to herein as a Responder, although the scope of the present invention is not limited in this respect. Other or different numbers of radios may be included.

According to one embodiment of the invention, STA A 210 and STA B 240 architecture and components may be similar to the architecture and components of STA 100 of FIG. 1 if desired, although other architectures may be used.

In operation STA A 210 may operate or execute a session 270 on a first frequency band (e.g., 60 GHz by radio A 110) and/or a first channel wherein, according to embodiments of the invention, session 270 is a state information kept or stored in a pair of stations that have an established direct physical link. STA A 210, for example an imitator, may set or establish an agreement with STA B 240, for example a responder, to operate or execute the session on a second frequency band (e.g., 2.4 GHz by radio B 120) and/or a second channel. STA A 210 and STA B 240 may establish a direct physical link on the second frequency band and/or the second channel, if desired. STA A 210 may transfer or move the session to the second frequency band and/or the second channel by using or executing for example, the FST protocol as is shown by a dotted line, although it should be understood that the scope of the present invention is not limited to this embodiment of the invention.

Turning to FIG. 3 a schematic illustration of an information element (IE) 300 used with an FST protocol, according to exemplary embodiments of the invention is shown. According to this exemplary embodiment of the invention, IE 300 may include an element identification (ID) field 310, a length field 320, a FST session (FSTS) ID field 330, a new band field 340 and an old band field 350.

According to this exemplary embodiment, element ID field 310 may include 1 octet to indicate the IE ID. Length field 320 may indicate the length of IE 300. FSTS ID field 330 may contain an identification of the FST session established between a pair of STAs as allocated by the initiator and may include for example 4 octets.

New Band 340 and Old Band 350 fields may be used for signaling used during an operation or execution of an FST protocol according to embodiments of the present invention. For example, each of New Band 340 and Old Band 350 fields may contain a Band ID subfield, a Setup subfield and an Operation subfield. The Band ID subfield may provide the identification of a frequency band an may indicate a desired and/or current frequency band and/or channel on which the session is operating or executing or may be transferred or moved to. For example, the Band ID subfield may be set to 1 for 2.4 GHz (LB) may be set to 2 for 5 GHz (HB) and may be set to 3 for 60 GHz (UB). The value 0 may be reserved. Other values and frequencies may be used.

The Setup and Operation subfields may contain 0 or 1 depending on the FST protocol operation. Other values may be reserved, although the scope of the present invention is not limited in this respect.

IE 300 may be part of, but is not limited to being part of, an FST setup request frame, an FST response frame, an FST Tear down frame, an FST acknowledgment (Ack) request frame and an FST Ack response frame, although the scope of the present invention is not limited in this respect.

FST Setup Request Frame

For example, an FST Setup Request frame is an Action frame of category FST. The FST Setup Request frame may allow an initiating station (e.g., initiator) to announce to other peer stations whether it intends to enable FST for the session between the source station and the peer station. An example format of the FST Setup Request is shown in Table 1.

TABLE 1

FST setup request frame

| Order | Information |
|---|---|
| 1 | Category |
| 2 | Action |
| 3 | LLT |
| 4 | Session Transition |
| 5 | Multi-Band (optional) |
| 6 | Wakeup Schedule (Optional) |
| 7 | Awake Window (Optional) |
| 8 | Switching stream (optional) |
| Last-1 | One or more resource and/or capability related information elements may appear in this frame. These information elements follow all other information elements that are not vendor-specific information elements and precede all other information elements that are vendor-specific information elements that are part of the Last field in the Action frame. |

In table 1, the Category field is set to the category for FST. The Action field is set to the value for FST Setup Request, the Link loss timeout (LLT) field may include 32 bits and may indicate the maximum duration of time, in microseconds, counted from the last time a data frame was received by a source STA from a peer STA until the source STA decides to initiate FST, and the Session Transition field may include the Session Transition element similar to information element 300 of FIG. 3.

The multi-band field may include a multi-band element. The multi-band element may indicate that the STA transmitting this element (the transmitting STA) may capable of operating in a frequency band other than the one in which this element is transmitted and that the transmitting STA is able to switch the session from the current channel to a channel in the other band. The regulatory information contained in the multi-band element is applicable to all the fields and elements contained in the frame. The Wakeup Schedule element may indicate a wakeup time of a station and a sleep interval between two successive wakeups, if desired. The Awake Window element may include the time of the awake window and the Switching Stream element indicates the streams that the transmitting STA requests to be switched to the new band of operation, although the scope of the present invention is not limited to this exemplary embodiment of the invention.

FST Setup Response Frame

According to exemplary embodiments of the invention, the FST Setup Response frame may be transmitted in response to the reception of a FST Setup Request frame. The format of the frame body is shown in Table 2.

TABLE 2

FST Setup response Frame

| Order | Information |
|---|---|
| 1 | Category |
| 2 | Action |
| 3 | Status Code |
| 4 | Session Transition |
| 5 | Multi-Band (optional) |
| 6 | Wakeup Schedule (Optional) |
| 7 | Awake Window (Optional) |
| 8 | Switching stream (optional) |

TABLE 2-continued

FST Setup response Frame

| Order | Information |
|---|---|
| Last-1 | One or more resource and/or capability related information elements may appear in this frame. These information elements follow all other information elements that are not vendor-specific information elements and precede all other information elements that are vendor-specific information elements that are part of the Last field in the Action frame. |

According to this example, the Category field is set to the category for FST. The Action field is set to the value for FST Setup Response and the Session Transition field contains the Session Transition element which may include identification of the FST session established between a pair of stations, the frequency band and/or the channel of the transferred session, if desired. The Multi-band element, the Wakeup Schedule element, the Awake Window element and the Switching Stream element are the same as it is in the FST setup request frame.

FST Tear Down Frame

The FST Tear-down frame is transmitted to delete an established FST session between stations. The format of the frame body is shown in Table 3.

TABLE 3

FST Tear Down Frame

| Order | Information |
|---|---|
| 1 | Category |
| 2 | Action |
| 3 | FSTS ID |

According to this example, the Category field is set to the category for FST, the Action field is set to the value for FST Tear-down and the FST session (FSTS) ID field contains the identification of the FST session established between the stations.

FST Ack Request Frame

The FST Ack Request frame is transmitted in the frequency band an FST session is transferred to and confirms the FST session transfer. The format of the frame body is shown in Table 4.

TABLE 4

FST Ack Request Frame

| Order | Information |
|---|---|
| 1 | Category |
| 2 | Action |
| 3 | Dialog Token |
| 4 | FSTS ID |

In this example, the category field is set to the category for FST, the Action field is set to the value for FST Ack Request, the Dialog Token field may be set to a nonzero value chosen by the STA sending the FST ACK request to identify the request/report transaction and the FSTS ID field contains the identification of the FST session established between the stations, if desired.

FST Ack Response Frame

The FST Ack Response frame is transmitted in response to the reception of an FST Ack Request frame. The format of the frame body is shown in Table 5.

TABLE 5

FST Ack Response Frame

| Order | Information |
|---|---|
| 1 | Category |
| 2 | Action |
| 3 | Dialog Token |
| 4 | FSTS ID |

In this example, the category field is set to the category for FST, The Action field is set to the value for FST Ack Response, the Dialog Token field may be set to the value in any corresponding FST Ack Request frame. For example, if the FST Ack Response frame is not being transmitted in response to a FST Ack Request frame, then the Dialog token may be set to 0. The FSTS ID field contains the identification of the FST session established between the stations, although the scope of the present invention is not limited to this example.

Turning to FIG. 4 a schematic illustration of a state diagram of an FST protocol 400, according to an exemplary embodiment of the invention is shown. Although the scope of the present invention is not limited in this respect, a detailed FST setup protocol that enables STAs to setup and operate over one or more channels for example, in the same and/or different frequency bands, the FST protocol state machine and the rules for transition between states will be described now with state diagram 400.

According to one embodiment of the invention, the protocol supports simultaneous and non-simultaneous operations. The FST setup protocol is a scalable protocol in which an FST may be setup in any frequency band for session transfer to any other frequency band. For example, a multiband STA, for example STA 100 which may operate on 2.4 GHz, 5 GHz and 60 GHz frequency bands may setup a FST in the 2.4 GHz frequency band for the transfer of a session in the 60 GHz frequency band to the 5 GHz frequency band, although the scope of the present invention is not limited in this respect.

FST Setup Protocol

According to embodiments of the invention, the FST setup protocol may define the transfer of an FST session between an initiator and a responder from their current frequency band and/or channel to another frequency band and/or channel. According to this exemplary embodiment of the invention, the FST setup protocol may include four states and plurality of rules to enable move or transition from one state to the next.

The first state may be an Initial state 410. In this state, the FST session is operational in one or more frequency bands and/or channels. The second state may be a setup completion state 420. In this state, both initiator and responder are ready to change the frequency band and the channel where the FST session(s) is (are) currently operating. The third state is Transition done state 430. In this state, both initiator and responder may operate in the other frequency band and/or channel if the value of the LLT field within the FST Setup Request frame used to setup the FST session was zero. The fourth state is a Transition confirmed state 440. In this state both initiator and responder may have to successfully communicate in the new frequency band and/or channel in order to reach the Transition confirmed state.

In operation, to transfer an FST session from Initial state 410 to the Setup Completion state 420, the (e.g., STA 210) and the responder (e.g., STA 240) may exchange FST Setup Request and FST Setup Response frames, if desired. The information element of FIG. 3 may be included in the FST setup response frame and setup request frame, if desired.

According to one example embodiment, in the Initial state 410 and in the Setup Completion states 420, the old frequency band and the old channel of the FST setup request and response frames may represent the frequency band and the channel from which the FST session is intending to be transferred from and the New frequency Band and the new channel may represent the frequency band of the FST setup request and response frames may represent the channel to which the FST session is intended to be transferred to.

In the Transition done state 430, the new frequency band and the new channel of the FST setup request and response frames may represent the frequency band/channel of the transferred state. Furthermore, in the FST Ack Request and FST Ack Response frames, the old frequency band/channel may represent the frequency band/channel the FST session is transferring from, although the scope of the present invention is not limited to this example.

Continuing with FST setup, the responder (e.g., STA 240) may set, for example, the Status Code field to 0 (success) of the FST setup response frame, if it accepts the FST Setup Request, may set the Status Code to 39 of the FST setup response frame (e.g., declined, with suggestions) to indicate that one or more parameters of the FST Setup Request are invalid and may suggest alternative parameters, may set the Status Code of the FST setup response frame, for example, to 55 (pending) to indicate that a FST Setup Request is pending, and may set the Status Code field of the FST setup response frame for example, to 37 (declined) to reject a FST Setup Request although the scope of the present invention is not limited to this example.

According to one exemplary embodiment of the invention, a state transition within the FST setup protocol may be controlled by a State Transition Timer (STT), if desired. For example, each multiband STA may maintain a STT for each FST session. The multiband stations may move or transition to Initial state 410 when the STT moves from one to zero, or upon reception and/or transmission of an FST Tear down frame, if desired.

The initiator may set the STT to the value of, for example, the FST session time out at successful transmission of a FST Setup Request (e.g. a request frame) and at each ACK frame sent in response to a received FST Setup Response (e.g. a response frame) with the status code field equal for example, to 55. The initiator may set the STT to zero at the transmission of an ACK frame sent in response to a received FST Setup Response frame with the value of the status code field equal, for example, to 0. The initiator may send a FST Setup Request frame no later than for example. FST session timeout value after the transmission of the FST Ack response frame in response to a received FST Setup Response with status code field equal to 0, if desired.

The responder may set the STT to the value of the FST session timeout field at successful transmission of a FST Setup Response frame. The responder may set the STT to zero at each transmission of an ACK frame sent in response to the reception of an FST Setup Request. For example, the responder may send an FST Setup Response frame no later than FST session timeout value after the transmission of an ACK frame sent in response to a received FST Setup Request frame or successful transmission of a FST Setup Response frame with the status code field equal, for example, to 55. In the latter case the responder may transmit the unsolicited FST Setup Response frame to the initiator, although the scope of the present invention is not limited to this example.

According to some exemplary embodiments of the invention, there may be multiple FST Setup Request and FST Setup Response frame transmissions by, respectively, the initiator and the responder until the FST session between the initiator and the responder become established.

For example, at each transition from Initial state 410 to Setup completion state 420, the initiator and the responder may perform the following procedure:
1. The initiator may send an FST Setup Request frame to the responder.
2. Upon receipt of the FST Setup Request frame, the responder may respond with the FST Setup Response frame unless it has a pending FST Setup Request frame addressed to the initiator and the responder has a numerically larger MAC address than the initiator's MAC address, in which case, the responder may delete the received FST Setup Request (e.g. a frame).
3. If after the reception of the acknowledgement to the initiator's FST Setup Request frame the initiator may receive an FST Setup Request frame from the responder, the initiator may not respond with an FST Setup Response frame if its MAC address is numerically larger than the responder's MAC address. Otherwise if its MAC address is numerically smaller than the responder's MAC address it becomes the responder and respond with the FST Setup Response frame and may not send the FST Setup Request frame during the current FST session transition.
4. The initiator may not move or transition to the next state if at least one of the following conditions are met:
    a) The initiator may not transmit an ACK frame in response to the receipt of a FST Setup Response frame from the responder
    b) The value of the status code field in the received FST Response frame from the responder is different than 0 (other values may be used). .
    c) If a state specific exception in Table 6 below takes place.
5. The initiator may move or transition to the next state if none of conditions 4(a), 4(b), and 4(c) is met.
6. The responder may not move or transition to the next state if at least one of the following conditions are met:
    a) The responder does not receive the acknowledgement to its transmitted FST Setup Response frame.
    b) The value of the status code field in the FST Setup Response frame it transmitted to the initiator was different than 0 (other values may be used).
    c) The value of the Setup and Operation subfields within the Session Transition element in the transmitted FST Setup Response frame results in a status different than any of the rows shown in Table 6, in which case the responder may set the Status Code field with the transmitted FST Setup Response to 3, if desired.
    d) The resulting status of the Operation subfield in the New Band field is 0 (other values may be used).
7. The responder may move or transition to the next state if none of conditions 6(a), 6(b), 6(c) and 6(d) is met.

TABLE 6

Exceptions for the initiator

| State | Condition | Meaning | Next State |
|---|---|---|---|
| Initial | FST setup response with Status Code = 55 | Pending, no transmission of the FST setup request | Initial |
| Initial | FST setup response with Status Code = 39 | One or more parameters of the FST Setup Request is invalid and the responder suggests alternative parameters. | Initial |
| Initial | FST setup response with Status Code = 37 | Responder rejects the request. One particular case is that values of the regulatory class and channel number fields within the multi-band element, if any, received in the FST Setup Request frame is different than the value of the corresponding fields within the multi-band element, if any, transmitted in the following FST Setup Response | Initial |
| Initial | Resulting status is different than shown in the Table xyz | The responder is not able to complete the setup | Initial |
| Initial | Resulting status of the Operational field in the New Band filed is 0 in the Table xyz | The operation in the New band is disabled | Initial |
| Setup completion | FST setup response with Status Code = 0 and value of the LLT field within the FST Setup Request frame is greater than zero | The STA is ready to switch to the New band if the link is lost in the Old band | Setup Completion |
| Setup Completion | Transmission or reception of FST tear down frame | Termination of FST session | Initial |

According to exemplary embodiment of the invention, if upon transition to Setup Completion state 420 the value of the LLT field within the last FST Setup Request frame received was zero, the initiator and responder may immediately move or transition to the Transition done state.

Furthermore, if upon transition to Setup Completion state 420 the value of the LLT field within the last FST Setup Request frame received may be greater than zero, then both initiator and responder may remain or stay in Setup completion state 420 and may start a Link Loss countdown timer (LLCT) (e.g., LLCT 147) with an initial value of for example LLT*32 μsec. The LLCT may count down one bit every μsec. For example, the Link Loss countdown of each STA may be reloaded with the value of for example LLT*32 μsec every time that a unicast frame is received from the peer STA of the FST session. The FST transition from Setup completion state 420 to the Transition done state 430 may occur immediately after the LLCT transitions from one to zero within any of the initiator or responder of the FST session.

According to embodiments of the invention, Table 7 below shows the FST session status at each state transition. When the value of a subfield in the FST Setup Request is different from the value of that same subfield in the following FST Setup Response frame, the resulting status may be the logical AND of the value of the corresponding subfields in both the FST Setup Request and the FST Setup Response.

TABLE 7

FST status at state transition

| From State | Old band resulting status | | New band resulting status | | To State | Definition |
| --- | --- | --- | --- | --- | --- | --- |
| | Setup | Operation | Setup | Operation | | |
| Initial | 1 | 1 | 0 | 0 | Initial | New Band setup and operation are disabled |
| Initial | 1 | 1 | 1 | 0 | Initial | New Band operation is disabled, the setup is kept alive |
| Initial | 0 | 0 | Const = 1 | 1 | Setup Completion | FST session is operational in New Band |
| Initial | Const = 1 | 1 | Const = 1 | 1 | Setup Completion | FST Session is operational in both bands |
| Initial | 1 | 0 | Const = 1 | 1 | Setup Completion | FST Session is operational in New Band; FST session in Old Band is kept alive |
| Setup Completion | Unchanged | Unchanged | Unchanged | Unchanged | Transition done | No status changes |
| Transition done | Unchanged | Unchanged | Unchanged | Unchanged | Transition confirmed | No status changes |

Upon transition from the Transition done state 430 to the Transition confirmed state 440, the initiator and the responder may perform the following procedure within the channel number of the regulatory class and band ID specified in the multi-band element negotiated during the FST session setup:

1. The State transition may be controlled by the State Transition Timer (STT) e.g., STT 145. Each STA of the FST session may have its own STT. The initiator and the responder may move or transition to the Initial state when the STT may change its value from one to zero. The initiator may set the STT to the value of the FST session timeout at successful transmission of an FST Ack Request frame or at transmission of any unicast data unit to responder. The initiator may set the STT to zero at the transmission of an ACK sent in response to a received FST Ack Response from the responder or at reception of an ACK frame received in response to a frame sent to the responder. The responder may set the STT to FST session timeout value at transmission of an FST Ack Response frame or at transmission of any other unicast data units to the initiator. The responder may set the STT value to zero at reception of an ACK frame received in response to a transmitted FST Ack Response frame or at the reception of any unicast frame sent by the initiator. The responder may transmit an FST Ack Response frame to the initiator no later than FST session timeout value after the transmission of an ACK frame sent in response to a received FST Ack Request from the initiator.
2. The initiator may send an FST Ack Request frame or may send any other unicast data frame to the responder.
3. Upon receipt of an FST Ack Request frame, the responder may respond to the initiator with an FST Ack Response frame.
4. The initiator may move or transition to the Transition Confirmed state upon transmission of an ACK frame sent in response to a FST Ack Response frame or any other unicast frame received from the responder or when it receives an ACK frame from the responder to any non FST Ack Request frame the initiator transmitted to the responder.
5. The responder may move or transition to the Transition Confirmed state when it receives an ACK frame in response to a FST Ack Response frame or any other unicast frame sent to the initiator or upon transmission of an ACK frame sent in response to any non FST Ack Request unicast frame.

Embodiments of the invention may include an article such as a computer or processor readable medium, or a computer or processor storage medium, such as for example a memory, a disk drive, or a USB flash memory, encoding, including or storing instructions which when executed by a processor or controller, carry out methods disclosed herein.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method of transferring a session using a fast session transfer (FST) setup protocol, wherein the FST setup protocol comprises an initial state, a setup completion state, a transition done state and a transition confirmed state, the method comprising:
   operating the session on a first frequency band and/or a first channel during the initial state, wherein the session is described by state information stored in at least a first station of first and second stations that have an established direct physical link;
   setting an agreement to operate the session on a second frequency band and/or a second channel by communicating an FST setup request frame and communicating an FST response frame;
   transitioning to the setup completion state if a timeout has not been received or an FST tear down frame has not been received;
   communicating at the first frequency band and/or the first channel in the setup completion state;
   establishing a direct physical link on the second frequency band and/or the second channel; and
   transferring the session to the second frequency band and/or the second channel, wherein the transfer of the session is from the first channel to the second channel between the first station and the second station, wherein the first station has radios to communicate with matching radios of the second station in one or more of the first and the second frequency bands.

2. The method of claim 1, comprising:
   staying at the setup completion state if a value of a Link loss timeout (LLT) field at the FST setup request frame is greater than zero, wherein the value of the LLT field includes 32 bits and indicates a maximum duration of time, in microseconds, counted from a last time a data frame was received by the first station from the second station until the first station decides to initiate the FST.

3. The method of claim 2, comprising
   transitioning from the setup completion state to the transition done state if the LLT value at the FST setup request frame is equal to zero; and
   communicating at the second frequency band and/or the second channel in the transition done state.

4. The method of claim 3, comprising:
   transitioning from the transition done state to the initial state if a timeout has been reached; and
   communicating at the first frequency band and/or the first channel in the initial state.

5. The method of claim 3, comprising:
   transitioning from the transition done state to the transition confirmed state after completion of exchanging an FST acknowledgment request frame and an FST acknowledgment response frame;
   transferring the session; and
   communicating at the second frequency band and/or the second channel in the transition confirmed state.

6. A multiband station comprising:
   a first radio to operate a session on a first frequency band and/or a first channel wherein the session is described by state information to be stored in at least a first station of first and second stations that have an established direct physical link; and
   a medium access control (MAC) processor to set an agreement to operate the session on a second frequency band and/or a second channel using a second radio, to establish a direct physical link on the second frequency band and/or the second channel using the second radio and to transfer the session to the second frequency band and/or the second channel by using a fast session transfer (FST) setup protocol comprising an initial state, a setup completion state, a transition done state and a transition confirmed state, wherein the transfer of the session from the first channel to the second channel is to be between the first station and the second station, wherein said first and second radios are to communicate with matching radios of the second station in one or more of the first and the second frequency bands, the FST setup protocol comprises:
   communicating in the first frequency band and/or the first channel in the initial state;
   sending an FST setup request frame;
   receiving an FST setup response frame;
   transitioning to the setup completion state if a timeout has not been received or an FST tear down frame has not been received; and
   communicating at the first frequency band and/or the first channel in the setup completion state.

7. The multiband station of claim 6, wherein the FST setup protocol comprises:
   staying at the setup completion state if a value of a Link loss timeout (LLT) field at the FST setup request frame is greater than zero, wherein the value of the LLT field includes 32 bits and indicates a maximum duration of time, in microseconds, counted from a last time of reception of a data frame by the first station from the second station until decision of the first station to initiate the FST.

8. The multiband station of claim 7, wherein the FST setup protocol comprises:
   transitioning from the setup completion state to the transition done state if the LLT value at the FST setup request frame is equal to zero; and
   communicating at the second frequency band and/or the second channel in the transition done state.

9. The multiband station of claim 8, wherein the FST setup protocol comprises:
   transitioning from the transition done state to the initial state if a timeout has been reached; and
   communicating at the first frequency band and/or the first channel in the initial state.

10. The multiband station of claim 8, wherein the FST setup protocol comprises:
   transitioning from the transition done state to the transition confirmed state after completion of exchanging an FST acknowledgment request frame and an FST acknowledgment response frame;
   transferring the session; and
   communicating at the second frequency band and/or the second channel in the transition confirmed state.

11. A wireless communication system comprising:
a first multiband-stations to communicate with a second multiband station, wherein the first multiband station comprises:
at least a first radio and a second radio, wherein the first radio is to operate a session on a first frequency band and/or a first channel, wherein the session is to be described by state information to be stored in said first multiband station; and
a medium access control (MAC) processor to set an agreement to operate the session on a second frequency band and/or a second channel using the second radio, to establish a direct physical link on the second frequency band and/or the second channel using the second radio and to transfer the session to the second frequency band and/or the second channel by using a fast session transfer (FST) setup protocol comprising an initial state, a setup completion state, a transition done state and a transition confirmed state, wherein the transfer of the session from the first channel to the second channel is between the first station and the second station, wherein said first and second radios are to communicate with matching radios of the second station in one or more of the first and the second frequency bands, the FST setup protocol comprises:
communicating in the first frequency band and/or the first channel in the initial state;
sending an FST setup request frame;
receiving an FST setup response frame;
transitioning to the setup completion state if a timeout has not been received or an FST tear down frame has not been received; and
communicating at the first frequency band and/or the first channel in the setup completion state.

12. The wireless communication system of claim 11, wherein the FST setup protocol comprises:
staying at the setup completion state if a value of a Link loss timeout (LLT) field at the FST setup request frame is greater than zero, wherein the value of the LLT field includes 32 bits and indicates a maximum duration of time, in microseconds, counted from a last time of reception of a data frame by the first station from the second station until decision of the first station to initiate the FST.

13. The wireless communication system of claim 12, wherein the FST setup protocol comprises:
transitioning from the setup completion state to the transition done state if the LLT value at the FST setup request frame is equal to zero; and
communicating at the second frequency band and/or the second channel in the transition done state.

14. The wireless communication system of claim 13, wherein the FST setup protocol comprises:
transitioning from the transition done state to the initial state if a timeout has been reached; and
communicating at the first frequency band and/or the first channel in the initial state.

15. The wireless communication system of claim 13, wherein the FST setup protocol comprises:
transitioning from the transition done state to the transition confirmed state after completion of exchanging an FST acknowledgment request frame and an FST acknowledgment response frame;
transferring the session; and
communicating at the second frequency band and/or the second channel in the transition confirmed state.

* * * * *